US005365262A

United States Patent [19]

Hattori et al.

[11] Patent Number: 5,365,262

[45] Date of Patent: Nov. 15, 1994

[54] SEALED INSULATED INK CONTAINER

[75] Inventors: Yoshifumi Hattori, Yamato; Masashi Kitani; Etsurou Suzuki, both of Yokohama; Hideo Saikawa, Kawasaki; Masami Kojima; Kenji Kawano, both of Tokyo; Koichi Tanno; Kenji Aono, both of Kawasaki, all of Japan

[73] Assignee: Canon Kabushiki Kaisha, Tokyo, Japan

[21] Appl. No.: 186,506

[22] Filed: Jan. 26, 1994

Related U.S. Application Data

[63] Continuation of Ser. No. 802,550, Dec. 5, 1991, abandoned.

[30] Foreign Application Priority Data

Dec. 10, 1990 [JP] Japan .................................. 2-409960

[51] Int. Cl.$^{5}$ ........................ G01D 15/16; G01D 15/18

[52] U.S. Cl. .......................................... 347/87; 347/86

[58] Field of Search ................................ 347/86, 87, 6; 222/146.1; 101/366, 364; 220/426, 422

[56] References Cited

U.S. PATENT DOCUMENTS

| | | | |
|---|---|---|---|
| 4,357,809 | 11/1982 | Held et al. | 220/426 X |
| 4,503,442 | 3/1985 | Barbero et al. | 346/140 R |
| 4,580,148 | 4/1986 | Domoto et al. | 346/140 R |

FOREIGN PATENT DOCUMENTS

| | | |
|---|---|---|
| 0367413 | 5/1990 | European Pat. Off. . |
| 0372895 | 6/1990 | European Pat. Off. . |
| 60-151055 | 8/1985 | Japan . |

*Primary Examiner*—A. T. Grimley
*Assistant Examiner*—Sandra L. Brasé
*Attorney, Agent, or Firm*—Fitzpatrick, Cella, Harper & Scinto

[57] ABSTRACT

An ink container for containing ink includes an outer casing; an inner casing, in the outer casing, for containing the ink therein; filler material disposed between the outer casing and the inner casing to isolate the ink from ambient condition change.

13 Claims, 3 Drawing Sheets

SEALED INSULATED INK CONTAINER

This application is a continuation of application Ser. No. 07/802,550 filed Dec. 5, 1991, now abandoned.

FIELD OF THE INVENTION AND RELATED ART

The present invention relates to an ink container for containing ink and a recording head cartridge having the same integrally, for an ink jet recording apparatus.

Recently, an ink jet recording process is particularly noted in which droplets of ink are imagewisely ejected through an ejection outlets of a recording head to effect a recording with dots of the droplets. There are generally two ink supply systems. In one of them, the liquid ink is contained in a flexible bladder having aluminum evaporation coating, and the bladder is accommodated in a casing to constitute a replaceable ink cartridge. From the ink cartridge the ink is supplied to the recording head mounted in an ink jet recording apparatus, through an ink supply system such as tube. In the other system, the ink container contains ink absorbing material filled with the ink. The ink container is integral with the recording head, and the recording head with the integral ink container is as a hole while detachably mountable to the apparatus. This is called an ink jet head cartridge. In the latter case, the vacuum produced in the ink absorbing material is increased in accordance with consumption of the ink. In some cases, it is not possible to supply the ink to the extent that no ink is in the cartridge, as has been found by the inventors of this application.

Therefore, many attempts have been made to adopt the ink bladder structure in the ink jet head cartridge or another structure in which the ink is contained in the cartridge without the ink absorbing material, so that the ink is more efficiently used.

However, even if the aluminum evaporation coated bladder is used as the ink container as in the ink container cartridge, it is difficult to produce proper vacuum, and therefore, the ink bladder is not suitable for an integral head cartridge (integral with the ink container). In the case of a type using an ink bladder having elasticity to produce the vacuum using the elasticity of the ink bladder, the ink supply is improved. However, the elastic ink bladder, depending on the material of the bladder, gives rise to a problem of the evaporation of the ink in the long term, introduction of air, the ink characteristics change (viscosity change, precipitation, for example), due to the ambient condition change, for the like. When the recording head is moved to scan the recording material in the direction of the width of the recording material, the ink bladder may move (swinging or vibration) in the cartridge, which might influence the ink supply.

In the type of the recording head in which the ink is ejected using the thermal energy, the ink is ejected by instantaneous creation of a bubble in the ink. The size of the ink passage in which the bubble is created and the size of the ejection outlets ejecting the droplets of the ink, are small, the characteristics of the ink and the state of the ejected ink are relatively significantly influential to the quantity of the ejected ink.

When the viscosity of the ink is high, the creation of the bubble for ejecting the droplet of the ink is not sufficient with the result of smaller quantity of the liquid in a ejected droplet. Even if the creation of the bubble is sufficient, if the viscosity is high, the quantity of the ink corresponding to the generation of the bubble is not difficult. As a result, the density of the picture element provided by the ejected ink droplet varies in accordance with the characteristics of the ink such as the viscosity or the like. The viscosity is high when the ink temperature is low, and the viscosity is increased by the evaporation of the water content in the ink.

When fine air bubbles are contained in the ink, the bubbles obstruct the creation of the bubble contributable to the ejection of the ink, thus reducing the quantity of the ink in a droplet of the ink. In addition, the mixture of the air bubbles reduce the quantity of the ink of the droplet. The small air bubbles in the ink are put together into a relatively large bubble, which may impede the flow of the ink in the ink passage.

SUMMARY OF THE INVENTION

Accordingly, it is a principal object of the present invention to provide an ink container in which the characteristics of the ink hardly changes, by which the print quality is stably high.

It is another object of the present invention to provide an ink container in which the ink is kept under the condition suitable for the ink ejection.

It is a further object of the present invention to provide an ink container, an ink jet recording head cartridge integrally having the ink container, and an ink jet recording apparatus usable with the ink container or the recording head cartridge in which the ink characteristics are maintained stably.

According to an aspect of the present invention, there is provided an ink container for containing ink, comprising: an outer casing; an inner casing, in said outer casing, for containing the ink therein; filler material disposed between said outer casing and said inner casing to isolate the ink from ambient condition change.

According to another aspect of the present invention, there is provided a recording head cartridge, comprising: an ink container for containing ink, including an outer casing; an inner casing, in said outer casing, for containing the ink therein; filler material disposed between said outer casing and said inner casing to isolate the ink from ambient condition change; a recording head for ejecting the ink from said ink container; and mounting means for integrally mounting said ink container and said recording head.

According to a further aspect of the present invention, there is provided an ink jet recording apparatus for effecting recording by ejecting ink, comprising: a recording head cartridge, including an ink container for containing ink, said container including an outer casing; an inner casing, in said outer casing, for containing the ink therein; filler material disposed between said outer casing and said inner casing to isolate the ink from ambient condition change; a recording head for ejecting the ink from said ink container; mounting means for integrally mounting said ink container and said recording head; and a mounting portion for receiving said recording head and said ink container.

According to the present invention, the ink container comprises an outer casing and an inner casing for containing the ink. Between the outer casing and the inner casing, the space is filled with a filler material, so that the ink is thermally insulated. The filler material is effective to prevent air introduction into the ink or the ink evaporation. Therefore, the ink accommodated therein can be stably maintained at proper states without deterioration of the recording characteristics. In addition, the ink use efficiency is improved.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
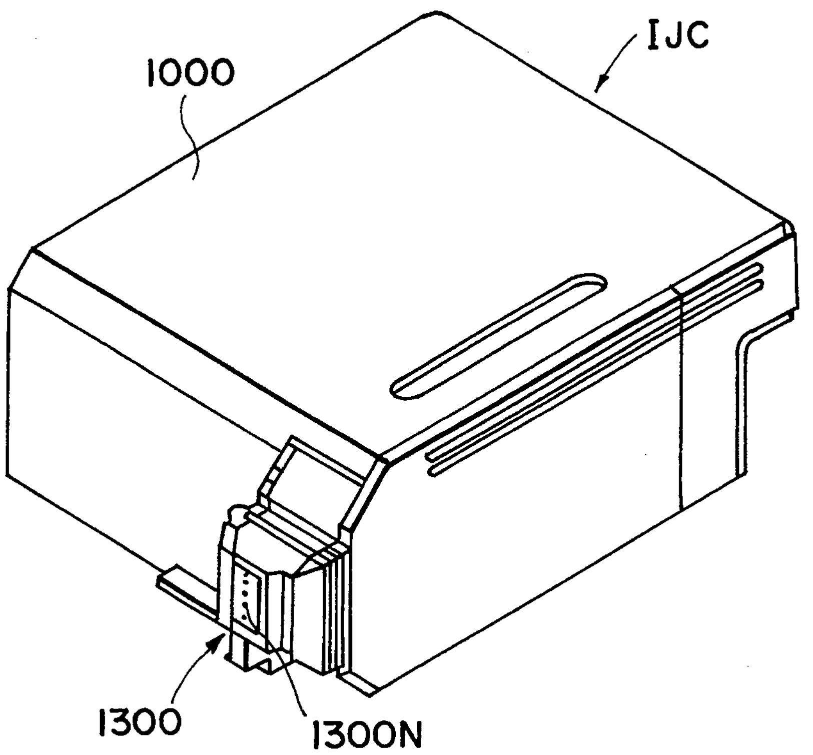
FIG. 1 is a perspective view of a recording head cartridge according to an embodiment of the present invention.

Referring to FIG. 1, there is shown a recording head cartridge comprising a recording head and an integral ink container. As shown in this Figure, the recording head cartridge (head cartridge) IJC is mainly comprised of a recording head 1300 and an ink container 1000. They are integrally formed. The head cartridge IJC, as shown in FIG. 7, for example, is detachably mountable to the ink jet recording apparatus. When the ink in the ink container 1000 is used up, it is replaced with a flesh recording head cartridge.

In FIG. 1, the recording head 1300 comprises an unshown base plate, plural electrothermal transducer elements and driving circuit therefor. Onto the base plate, a top plate having proper grooves and recess is mounted so that the ejection outlets and ink passages corresponding to the electrothermal transducer elements and the common chamber communicating with the ink passages are formed. In FIG. 1, the ejection outlet surface having the ejection outlets 1300N is shown.

Figure 2:
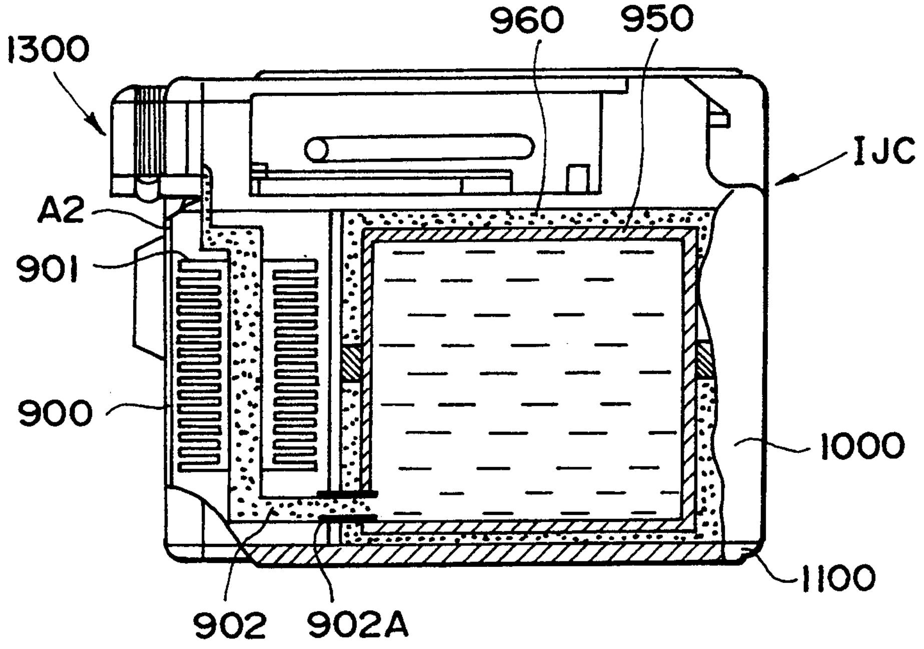
FIG. 2 is a top plan view of a recording head cartridge according to an embodiment of the present invention.
Figure 3:
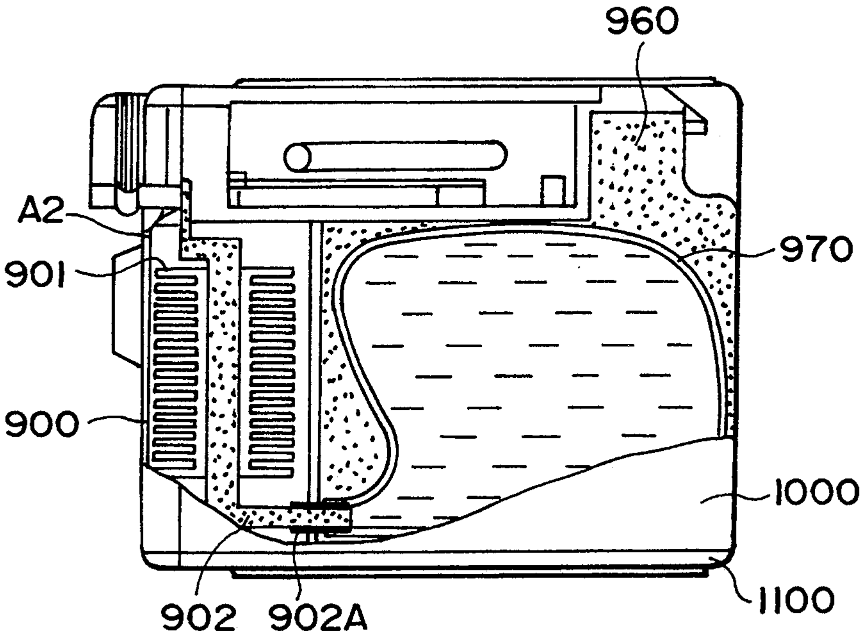
FIG. 3 is a top plan view of a recording head cartridge according to another embodiment of the present invention.
Figure 4:
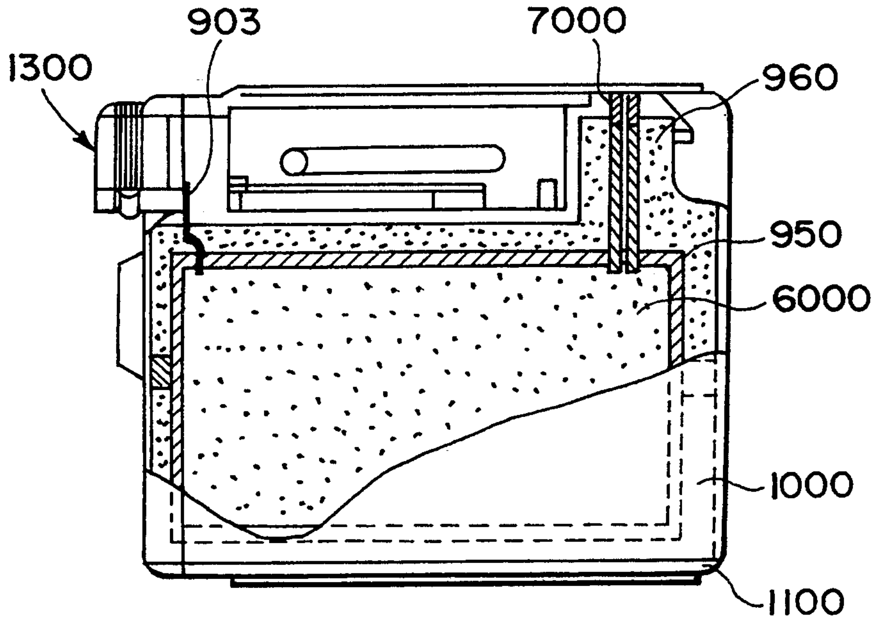
FIG. 4 is a top plan view of a recording head cartridge according to a further embodiment of the present invention.

As will be understood from FIGS. 2, 3 and 4, the ink container 1000 occupies a major part of the head cartridge IJC, and the ink containing chamber is provided therein.

FIG. 2 is a top plan view partly cross-section. In FIG. 2, an ink retaining member 900 functions to temporarily retain the ink when the pressure in the ink container changes. It comprises a plurality of annular thin plate or helical thin plate 901 for providing a groove or grooves for retaining the ink, a felt core 902 for introducing the ink to the ink supply outlet for the recording head, a slit for projecting the thin portions 901 to provide the capillary force, and a communicating part for introducing the ink from the felt core 902 thereto. In this embodiment or the following embodiments, which has the temporary retaining member, the vacuum relative to the recording head is maintained by the felt core 902.

The retaining member 900 is disposed adjacent the ink containing chamber of the container 1000 and in the ink supplying passage between the ink containing chamber and the recording head 1300. It is separated from the ink containing chamber, and the ambience therearound is opened to the environmental air through an air vent A2.

As shown in FIG. 2, the ink containing chamber has a double shell structure. More particularly, a containing chamber is provided by a part of a case Of the ink container 1000, and in the containing chamber, there is an internal container 950 in the form of an inner casing having the similar structure as the containing chamber. The ink is contained in the inner container 950. The inner containing 950 is supported at two positions in the ink containing chamber. The other portion in the containing chamber except for the internal container 950, there is filled liquid or powdery filler material 960. The inside of the internal ink container 950 is communicated with the ambience by a communicating passage provided by a conduit 902A around the felt core 902.

As described in the foregoing, the double shell structure and the filler material between the outer and inner shells, by which thermal insulation effect is provided to maintain a substantially constant ink temperature therein independently of the ambient temperature. Even when the head cartridge is kept unuse, the water content in the ink is prevented from evaporating through the casing or the connecting parts. On the contrary, the introduction of the air into the ink can be reduced. As a result, the ink is maintained in the state suitable for the ink ejection by the recording head.

With the structure of the ink container having the temporary retaining member 900, the air is introduced into the container 950 with the consumption of the ink. Therefore, if the sudden change occurs in the ambient temperature, for example, a quick temperature rise occurs, the air in the container 950 expands, with the result that the ink is pushed, but it is temporarily retained in the member 900. However, if the air is introduced into the container 950 by other than the ink consumption through the internal tank 950 casing, unexpected air expansion occurs. If it exceeds the capacity of the temporary retaining member 900, the ink leaks at the recording head. Therefore, in order to prevent the introduction of the unnecessary air into the inner container 950, the provision of the filler material 960 around the inside ink container 950 is advantageous.

The liquid usable as the filler material has a larger specific heat and has a non-volatile property, preferably. The viscosity of the liquid is preferably high so that the motion thereof resulting from the recording movement of the head cartridge attenuates quickly so as not to influence the recording operation. If the filler material is powdery, it has preferably the characteristics of absorbing the ink in case where the ink leaks out of the internal case 950.

Examples of such filler liquids include n-heptanol, 2-heptanol, 3-heptanol, n-octanol, 2-octanol, 2-ethylhexanol, 2-ethylbutanol, methylamide alcohol, nonanol, ethylene glycol, diethylene glycol, triethylene glycol, glyceline, propylene glycol, valeric acid, silicone oil.

Examples of filler powder include polyethylene powder, polypropylene powder, nylon powder, polystyrene powder, polyimide resin powder, methacryl resin powder, powdery NBR, tetrafluoroethylene resin powder, vinyl chloride resin powder.

FIG. 3 is a top plan view of a head cartridge according to another embodiment of the present invention. In FIG. 3, in place of the inner container is in the form of an ink bladder 970 made of flexible material such as rubber. Similarly to FIG. 2 embodiment, the space between the bladder accommodator and the ink bladder 970 is filled with the filler material 960. By doing so, the same advantageous effects are provided. The existence of the filler material 960 buffers the motion of the ink bladder 970 resulting from the recording movement of the head cartridge. Particularly, the possible mixture of the ink and the air increasing with consumption of the ink are prevented from mixing together by the vibration of the recording head. By doing so, the introduction of the air into the ink can be suppressed.

In this embodiment, an ink absorbing material made of porous material is contained in the ink container. More particularly, the ink absorbing material 6000 is contained in the inner tank 950, and the ink is retained in the absorbing material. The space in the inner tank accommodator except for the inner tank 950 is filled with the filler material 960 as in the foregoing embodiment. The air communication with the inside of the inner tank 950 is accomplished through a communicating pipe 7000. The configuration of the communicating pipe 7000 is not limited to the linear configuration shown in FIG. 4. If this is properly vent, the ink leakage from the inner tank 950 can be prevented. The ink supply to the recording head 1300 is effected through the supply pipe 903. With this structure, the temporary ink retaining member 900 shown in FIGS. 2 and 4 is not used. This is because the ink is retained in the absorbing material, and therefore, the pressure relation with the recording head can be maintained good, and therefore, the excessive ink supply from the internal tank 950 or the insufficient ink supply can be prevented.

In the conventional structure having the ink absorbing material 6000 in a single shell, if the sudden ambient condition change occurs, or when the ink distribution in the ink absorbing material changes, or the vacuum condition provided by the ink absorbing material changes, the unusably remaining ink increases. However, using the structure of the present invention, the temperature condition under which the ink is maintained is extremely stabilized, and therefore, the ink distribution in the ink container, the vacuum condition do not change significantly, and therefore, the ink supply is stabilized, so that the unusably remaining ink can be reduced.

Figure 5:
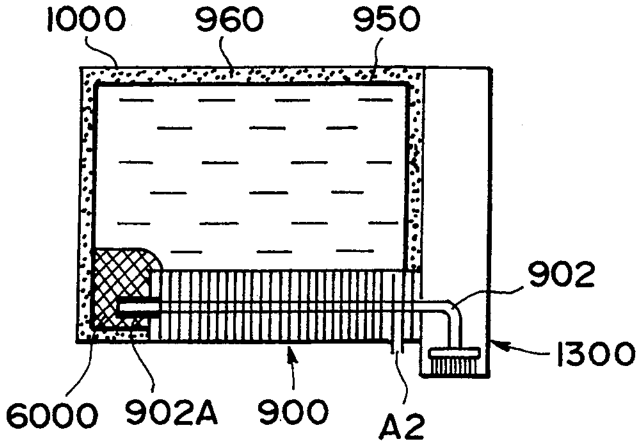
FIG. 5 is a top plan view of a recording head cartridge according to a yet further embodiment of the present invention.

FIG. 5 shows a head cartridge according to a further embodiment of the present invention. This embodiment corresponding to the combination of FIGS. 2 and 4 embodiments. In the ink passage from the inner container 950 to the recording head 1300 is provided with an ink retaining member 900 for temporarily retaining the ink. In a part of the internal container 950 is filled with an ink absorbing material 6000. With such a structure, the ink supply action is good. The ink absorbing material in the internal container 950 may occupy only a part thereof or the entirety thereof as shown in FIG. 4.

The present invention is usable with a recording head cartridge having an integral recording head and an ink container, but is also usable as an ink container itself which is detachably mountable to the recording head. In other words, the present invention may be incorporated in the ink container itself shown in FIGS. 2, 3, 4 and 5 with the same advantageous effects. The present invention may be usable in an ink cartridge with the same good advantageous effects. When the structure of the present invention is used in an ink cartridge, the filler material may be the one having good ink absorbing property. Since then, the filler material may be used as residual ink absorbing layer.

Figure 6:
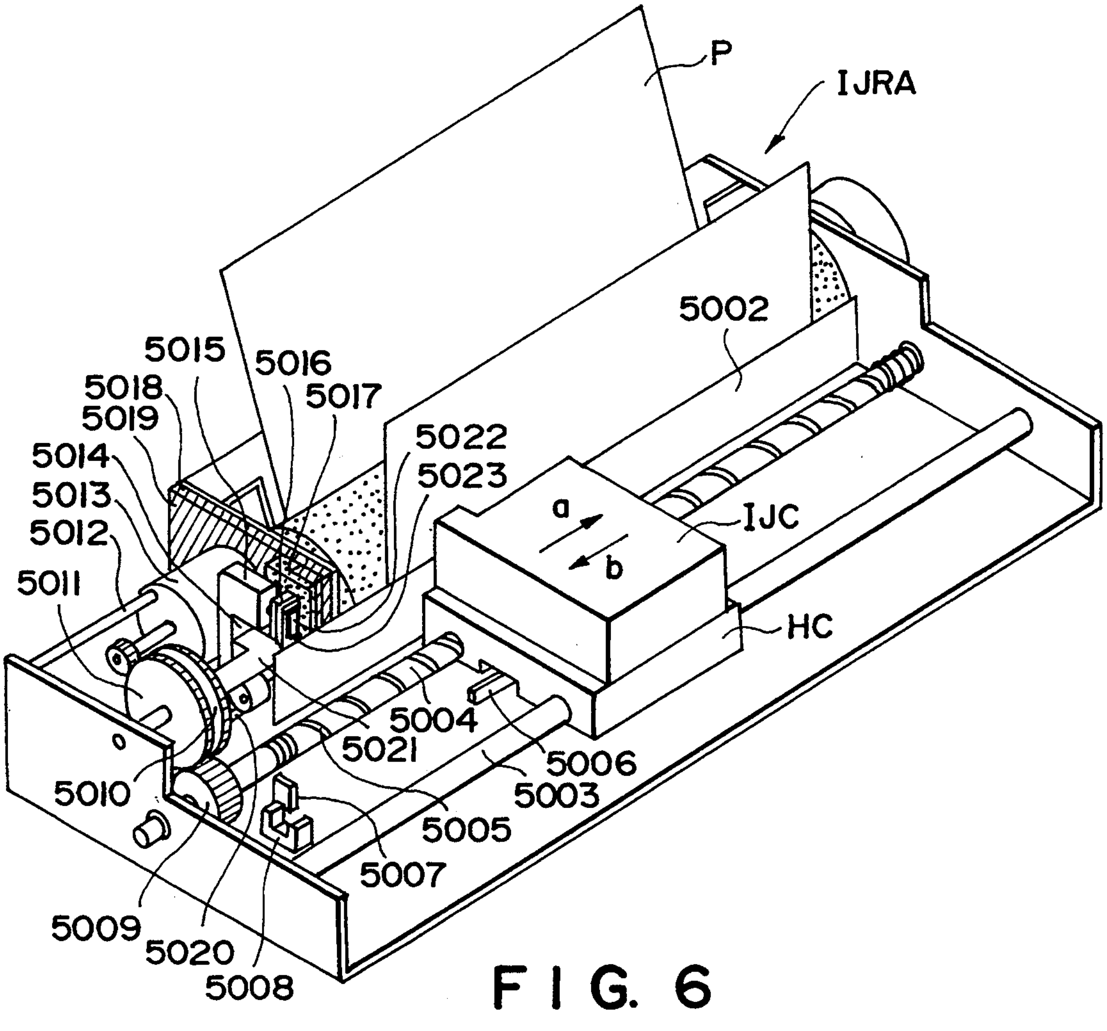
FIG. 6 is a perspective view of an example of an ink jet recording apparatus usable with the recording head cartridges shown in FIGS. 2–5.

Referring to FIG. 6, there is shown an ink jet recording apparatus ICRA incorporating the present invention. A carriage HC has a pin (not shown) engageable with helical groove of a lead screw 5005. The screw 5005 is driven through a driving gear 5011 and 5009 in association with forward or backward rotation of the driving motor 5013. Then, the carriage HC is reciprocated in the directions indicated by arrows a and b in accordance with the rotation of the lead screw. The head cartridge IJC shown in FIGS. 1 and 2 is mounted on the carriage HC. The structure for the positioning of the recording head and the structure for establishing the electric signal communication between the recording head and the main assembly of the ink jet recording apparatus, are omitted in FIG. 6 for simplicity. The detail thereof is disclosed in Japanese Patent Application Publication No. 241081/1988 which has been assigned to the assignee of this application. A confining plate 5002 confines the recording material such as paper or OHP film or the like. It urges the recording material on the platen 5000. A photocoupler constituted by the elements 5007 and 5008 functions to detect the presence of a lever 5006 of the carriage to switch the rotational direction of the motor 5013. The photocoupler functions as a home position detecting means. A supporting member 5016 supports a capping member 5022 for capping the front side of the recording head. A sucking means 5015 functions to suck the air out of the cap when it caps the front side. By doing so, the recording head recovery operation is effected by sucking the ink out through the ejection outlets. A cleaning blade 5017 is moved by a member 5019. They are supported on a main frame 5018. The blade may be of another known type. A lever 5012 is operated when the sucking recovery operation is started, and it moves together with the movement of the cam 5020 engaging with the carriage. The driving force from the driving motor is controlled by a known transmitting means such as clutching mechanism or the like. The capping, cleaning and the sucking recovery operation are carried out when the carriage HC is positioned at the home position region, by way of the lead screw 5005. However another mechanism may be used to carry out these operations at the known timing.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Patent Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Pat. Application No. 123670/1984 wherein a common slit is used as the ejection outlet for plural electrothermal transducers, and to the structure disclosed in Japanese Laid-Open Pat. Application No. 138461/1984 wherein an opening for absorbing pressure wave of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording head combined to cover the maximum width.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Pat. Application No. 56847/1979 and Japanese Laid-Open Pat. Application No. 71260/1985. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

As will be understood from the foregoing, according to the present invention, a double-shell structure is used, and the ink is contained in the internal casing. Between the outer casing and the inner casing, the filler material is provided to thermally insulate the ink in the container. In addition, the air introduction into the ink or the ink evaporation can be prevented. As a result, the ink can be maintained under the stabilized good conditions, and therefore, the ink is used up efficiently, and the proper recording operation can be carried out.

While the invention has been described with reference to the structures disclosed herein, it is not confined to the details set forth and this application is intended to cover such modifications or changes as may come within the purposes of the improvements or the scope of the following claims.

What is claimed is:

1. An ink container for containing ink, comprising:
an inner case for containing ink;
an outer case containing said inner case;
an ink supply passage for supplying the ink from said inner case to an ink jet recording head; and
a filler material of liquid or powder, having at least one of a heat insulative property and a sealing property, in a closed space defined by said inner case, outer case and said supply passage.

2. A recording head cartridge comprising:
an ink container having an inner case for containing ink and an outer case containing said inner case
a recording head for ejecting ink;
an ink supply passage for supplying the ink from said inner case to said ink jet recording head for ejection therefrom; and a filler material of liquid or powder, having at least one of a heat insulative property and a sealing property, in a closed space defined by said inner case, outer case and said supply passage.

3. A recording head cartridge according to claim 2, wherein film boiling is produced using thermal energy to create a bubble to eject the ink.

4. A recording head cartridge according to claim 2, wherein said ink supply passage has therein an ink absorbing material.

5. A recording head cartridge according to claim 2, wherein said inner case comprises a flexible bladder.

6. A recording head cartridge according to claim 2, wherein said inner case includes a rigid material.

7. A recording head cartridge according to claim 2, further comprising an ink absorbing material in a region connecting said inner case and said ink passage.

8. A recording head cartridge according to claim 2, wherein said filler material can absorb residual ink.

9. An ink jet recording apparatus for ejecting ink to effect recording, the apparatus comprising:

an ink container having an inner case for containing ink and an outer case containing said inner case;

a recording head for ejecting ink;

an ink supply passage for supplying the ink from said inner case to said ink jet recording head for ejection therefrom;

a filler material of liquid or powder, having at least one of a heat insulative property or a sealing property in a closed space defined by said inner case, outer case and said supply passage; and mounting means for mounting said ink container and said recording head.

10. An apparatus according to claim 9, wherein film boiling is produced using thermal energy to create a bubble to eject the ink.

11. An ink container for containing ink, comprising:

an inner case for containing ink;

an outer case containing said inner case;

an ink supply passage for supplying the ink from said inner case to an ink jet recording head; and a filler material, having at least one of a heat insulative property and a sealing property, in a closed space defined by said inner case, outer case and said supply passage.

12. An recording head cartridge comprising:

an ink container having an inner case for containing ink and an outer case containing said inner case;

a recording head for ejecting ink;

an ink supply passage for supplying the ink from said inner case to said ink jet recording head for ejection therefrom; and a filler material, having at least one of a heat insulative property and a sealing property, in a closed space defined by said inner case, outer case and said supply passage.

13. An ink jet recording apparatus for ejecting ink to effect recording, the apparatus comprising:

an ink container having an inner case for containing ink and an outer case containing said inner case;

a recording head for ejecting ink;

an ink supply passage for supplying the ink from said inner case to said ink jet recording head for ejection therefrom;

a filler material, having at least one of a heat insulative property or a sealing property in a closed space defined by said inner case, outer case and said supply passage; and mounting means for mounting said ink container and said recording head.

* * * * *

UNITED STATES PATENT AND TRADEMARK OFFICE

CERTIFICATE OF CORRECTION

PATENT NO. : 5,365,262
DATED : November 15, 1994
INVENTOR(S) : Yoshifumi Hattori et al It is certified that error appears in the above-indentified patent and that said Letters Patent is hereby corrected as shown below:

ON THE TITLE PAGE

At [56] References Cited

Under "U.S. PATENT DOCUMENTS" insert

--4,723,179 2/1988 Endo et al. ........346/1.1
4,459,600 7/1984 Sato et al. ........346/140R
4,558,333 12/1985 Sugitani et al. ....346/140R
4,345,262 8/1982 Shirato et al. .....346/140R
4,313,124 1/1982 Hara. ..............346/140R
4,740,796 4/1988 Endo et al. ........346/1.1
4,463,359 7/1984 Ayata et al. .......346/1.1--.

Under "FOREIGN PATENT DOCUMENTS" insert

--54-56847 5/1979 Japan
59-123670 7/1984 Japan
59-138461 8/1984 Japan
60-71260 4/1985 Japan
63-241081 10/1988 Japan--.

COLUMN 1

Line 14, "outlets" should read --outlet--.
Line 26, "hole" should read --whole--.
Line 51, "for" should read --or--.

UNITED STATES PATENT AND TRADEMARK OFFICE
CERTIFICATE OF CORRECTION

PATENT NO. : 5,365,262

DATED : November 15, 1994

INVENTOR(S) : Yoshifumi Hattori et al

It is certified that error appears in the above-indentified patent and that said Letters Patent is hereby corrected as shown below:

COLUMN 1

Line 59, "The" should read --When the--.
Line 62, "ink," should read --ink--.
Line 68, "a" should read --an--.

COLUMN 2

Line 13, "reduce" should read --reduces--.
Line 21, "changes," should read --change,--.

COLUMN 3

Line 39, "flesh" should read --fresh--.
Line 59, "plate" should read --plates--.
Line 60, "plate" should read --plates--.

COLUMN 4

Line 10, "Of" should read --of--.
Line 16, "The" should read --In the--.
Line 27, "unuse," should read --unused,--.
Line 63, "glyceline," should read --glycerine,--.

COLUMN 5

Line 27, "vent," should read --vented,--.
Line 51, "corresponding" should read --corresponds--.

UNITED STATES PATENT AND TRADEMARK OFFICE
CERTIFICATE OF CORRECTION

PATENT NO. : 5,365,262
DATED : November 15, 1994
INVENTOR(S) : Yoshifumi Hattori et al It is certified that error appears in the above-indentified patent and that said Letters Patent is hereby corrected as shown below:

COLUMN 6

Line 4, "property. Since then," should read --property, since then--.

COLUMN 8

Line 10, "is" (first occurrence) should read --in--.
Line 64, "case" (second occurrence) should read --case;--.

COLUMN 9

Line 34, "erty" should read --erty,--.

Signed and Sealed this

Ninth Day of May, 1995

Attest:

BRUCE LEHMAN

*Attesting Officer*

*Commissioner of Patents and Trademarks*